United States Patent Office 3,355,467
Patented Nov. 28, 1967

3,355,467
ZIRCONYL NITROPHENATES AND
THEIR PREPARATION
Eugene P. Di Bella, Rochelle Park, N.J., assignor to
Tenneco Chemicals, Inc., a corporation of Delaware
No Drawing. Filed June 17, 1964, Ser. No. 375,965
9 Claims. (Cl. 260—429.3)

ABSTRACT OF THE DISCLOSURE

Zirconyl nitrophenates, which have the structure

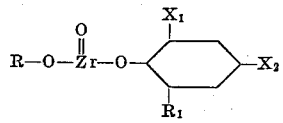

wherein R represents an alkyl group having from 2 to 22 carbon atoms or the group having the structure

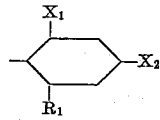

$X_1$ and $X_2$ each represents H or $NO_2$, at least one of them representing $NO_2$; and $R_1$ represents an alkyl group having from 1 to 4 carbon atoms, may be used to control the growth of weeds in an area containing a crop. Particularly useful as selective herbicides are circonyl bis (2-nitrophenate), zirconyl bis (2,4-dinitrophenate), and zirconyl bis (2,4-dinitro-6-methylphenate).

This invention relates to zirconyl nitrophenates. It further relates to the use of these novel compounds in the control or inhibition of plant growth.

In accordance with this invention, it has been discovered that zirconyl nitrophenates have unusual and valuable activity as selective herbicides. These compounds have the structure

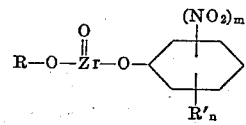

wherein R represents an alkyl group having from 8 to 22 carbon atoms or the group having the structure

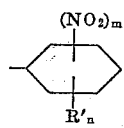

$m$ represents an integer in the range of 1 to 3, $n$ represents an integer in the range of 0 to 1, and R′ represents an alkyl group having from 1 to 4 carbon atoms. The preferred compounds for use as selective herbicides are those in which the nitro and alkyl substituents on the phenyl ring are in the positions ortho and/or para to the oxygen atom. Illustrative of these compounds are zirconyl bis (2-nitrophenate), zirconyl bis (4-nitrophenate), zirconyl bis (2,4-dinitrophenate), zirconyl bis (2,4,6-trinitrophenate), zirconyl bis (2,4-dinitro-6-methylphenate), zirconyl bis (2,4 - dinitro - 6 - butylphenate), zirconyl 4-nitrophenate octyloxide, zirconyl 2,4-dinitrophenate decyloxide, zirconyl 2,4-dinitrophenate octadecyloxide, and the like.

The novel compounds of this invention may be prepared by any convenient procedure. One procedure that has proven satisfactory involves the reaction of zirconium tetrachloride with the appropriate nitrophenol and, if a zirconyl nitrophenate alkoxide is being prepared, a higher alkanol. This reaction is preferably carried out in the presence of a solvent, such as benzene, toluene, or xylene, in which the nitrophenol is soluble and at the reflux temperature of the reaction mixture. If desired, somewhat higher or lower reaction temperatures may be employed. In order to obtain the desired zirconyl compounds it is necessary to heat the zirconium tetrachloride with a stoichiometric excess of either the nitrophenol or the nitrophenol and alkanol, approximately 2 to 20 moles of the nitrophenol or nitrophenol and alkanol ordinarily being used for mole of zirconium tetrachloride. The heating of the reaction mixture is continued until the evolution of hydrogen chloride has ceased. The product that is recovered from the reaction mixture may be purified by known techniques, such as recrystallization or washing with a solvent, such as diethyl ether, that will separate unreacted reactants and by-products of the reaction from the product.

The zirconyl nitrophenates may be applied to a wide variety of plants to control or inhibit their growth. They are of particular value in the control of weeds in an area containing a crop.

While the compounds of this invention may be applied to plants or to the soil as such, they are preferably used in combination with an inert carrier. The zirconyl nitrophenates may be mixed with or deposited upon an inert finely-divided solid and employed as dusts. Such mixtures may also be dispersed in water with or without the aid of a wetting agent and the resulting aqueous suspensions employed as sprays. Alternatively, these compounds may be used as the active herbicidal constituents in hydrocarbon solutions, in oil-in-water emulsions, or in aqueous dispersions. The concentration of the zirconyl nitrophenates in the herbicidal composition may vary within wide limits and depends upon a number of factors, the most important of which are the amount of the composition to be applied per unit of area and the type or types of plants being treated. Mixtures of two or more of the novel zirconyl compounds may be used. If desired, other herbicidal compounds may also be present in the herbicidal compositions.

This invention is illustrated by the examples that follow. It is to be understood, however, that the examples are given for the purpose of illustration and that the invention is not limited as to any of the specific materials or conditions mentioned therein except as set forth in the accompanying claims.

Example 1

A mixture of 139 grams (1 mole) of o-nitrophenol in 300 ml. of xylene was heated to its reflux temperature in a reactor equipped with a Dean-Stark moisture trap and maintained at that temperature to remove traces of water. The solution was cooled to 25° C. Then 23.3 grams (0.1 mole) of zirconium tetrachloride was added, and the resulting mixture was heated at its reflux temperature (149°–151° C.) for 20 hours at the end of which period the evolution of hydrogen chloride had substantially ceased. Following removal of the xylene, the reaction mixture was cooled to 25° C. and 25 ml. of dimethylformamide and 600 ml. of diethyl ether were added to it. The mixture was cooled to 0° C., stirred for 30 minutes, and filtered. The product was washed thoroughly with diethyl ether and dried at 55° C. There was obtained 32.5 grams of zirconyl bis (2-nitrophenate) which contained 28.7% Zr (calculated for $Zr(O)(OC_6H_4NO_2)_2$, 23.8% Zr).

Example 2

A solution of 139 grams (1 mole) of p-nitrophenol in 300 ml. of xylene, which had been heated at its reflux temperature to remove moisture, was cooled to 70°–75° C. Then 23.3 grams (0.1 mole) of zirconium tetrachloride was added, and the resulting mixture was heated for 10 hours at 149° C. Following removal of the xylene, the reaction mixture was cooled to 25° C. and 25 ml. of dimethylformamide and 600 ml. of diethyl ether were added to it. The mixture was cooled to 0° C., stirred for 30 minutes, and filtered. The product was washed thoroughly with diethyl ether and dried at 55° C. There was obtained 28 grams of zirconyl bis (4-nitrophenate), which contained 25.1% Zr (calculated for $Zr(O)(OC_6H_4NO_2)_2$, 23.8% Zr).

Example 3

The procedure described in Example 1 was repeated using 184 grams (1.0 mole) of 2,4-dinitrophenol and 23.3 grams (0.1 mole) of zirconium tetrachloride. There was obtained 40 grams of zirconyl bis (2,4-dinitrophenate), which contained 21.5% Zr (calculated for $$Zr(O)[OC_6H_3(NO_2)_2]_2$$

18.9% Zr).

Example 4

The procedure described in Example 1 was repeated using 198 grams (1.0 mole) of 2,4-dinitro-6-methylphenol and 23.3 grams (0.1 mole) of zirconium tetrachloride. There was obtained 32 grams of zirconyl bis (2,4-dinitro-6-methylphenate), which contained 23% Zr (calculated for $Zr(O)[OC_6H_2(NO_2)_2CH_3]_2$, 17.8% Zr).

Example 5

The procedure described in Example 1 was repeated using 240 grams (1.0 mole) of 2,4-dinitro-6-sec. butylphenol and 23.3 grams (0.1 mole) of zirconium tetrachloride. There was obtained 39 grams of zirconyl bis (2,4-dinitro-6-sec. butylphenate), which contained 22.8% Zr (calculated for $Zr(O)[OC_6H_2(NO_2)_2C_4H_9]_2$, 15.3% Zr).

Example 6

A solution of 27 grams (0.1 mole) of n-octadecyl alcohol in 300 ml. of xylene, which had been heated at its reflux temperature to remove traces of moisture, was cooled to 25° C. Then 23.3 grams (0.1 mole) of zirconium tetrachloride was added, and the resulting mixture was heated at its reflux temperature (120°–140° C.) for 2 hours and then cooled. To the resulting gelatinous mass was added 104 grams (0.75 mole) of p-nitrophenol. The mixture was heated with stirring at its reflux temperature (150° C.) for 20 hours. The crude product was washed and dried by the procedure described in Example 1. There was obtained 42 grams of zirconyl 4-nitrophenate octadecyloxide, which contained 21.3% Zr (calculated for $Zr(O)(OC_{18}H_{37})(OC_6H_4NO_2)$, 17.7% Zr).

Example 7

Groups of greenhouse flats containing soil were planted with seeds of various crop and weed species. Two to four weeks after planting the plants were sprayed with an 0.3% aqueous suspension of one of the zirconyl nitrophenates of this invention. The amount of the suspension used in each case was such as to apply the herbicidal compound at a rate equivalent to 10 pounds per acre. In each case the results were observed 2 weeks after the application of the herbicidal composition.

In the table that follows the effectiveness of the herbicidal compound, as determined by comparison with untreated plantings, is indicated by the numbers "0" through "10" in increasing order of effectiveness. Thus "0" indicates no herbicidal activity; "1"–"3," slight injury; "4"–"6," moderate injury; "7"–"9," severe injury; and "10," destruction of all plants.

| Plant Species | Zirconyl bis (2-nitrophenate) | Zirconyl bis (2,4-dinitrophenate) | Zirconyl bis (2,4-dinitro-6-methylphenate) |
|---|---|---|---|
| Soybean | 3 | 5 | 5 |
| Clover | 9 | 10 | 5 |
| Wheat | 0 | 0 | 0 |
| Sugar Beets | 0 | 10 | 10 |
| Corn | 1 | 3 | 1 |
| Mustard | 9 | 10 | 10 |
| Barnyard Grass | 0 | 0 | 0 |
| Yellow Foxtail | 0 | 0 | 0 |
| Crab Grass | 0 | 0 | 2 |
| Buckwheat | 4 | 10 | 10 |
| Pigweed | 2 | 4 | 7 |

From the data in the foregoing table, it is clear that the zirconyl nitrophenates show selective herbicidal activity against a variety of plant species. Equivalent results may be obtained with each of the other zirconyl nitrophenates of this invention.

In addition to being useful as selective herbicides, the zirconyl nitrophenates have also been found to be effective as agricultural fungicides.

What is claimed is:
1. Zirconyl bis (2-nitrophenate).
2. Zirconyl bis (4-nitrophenate).
3. Zirconyl bis (2,4-dinitrophenate).
4. Zirconyl bis (2,4-dinitro-6-methylphenate).
5. Zirconyl bis (2,4-dinitro-6-butylphenate).
6. Zirconyl 4-nitrophenate octadecyloxide.
7. The method for the production of zirconyl nitrophenates which comprises heating zirconium tetrachloride with a stoichiometric excess of a nitrophenol in the presence of a solvent selected from the group consisting of benzene, toluene, and xylene at the reflux temperature of the reaction mixture until the evolution of hydrogen chloride ceases.
8. The method for the production of zirconyl nitrophenates which comprises heating a reaction mixture comprising zirconium tetrachloride and a nitrophenol in the presence of a solvent selected from the group consisting of benzene, toluene, and xylene at the reflux temperature of the reaction mixture until the evolution of hydrogen chloride ceases, said reaction mixture containing approximately 2 moles to 20 moles of the nitrophenol per mole of zirconium tetrachloride.
9. A zirconyl nitrophenate having the structure

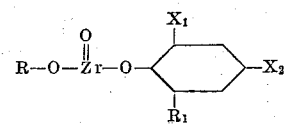

wherein R represents a member selected from the group consisting of (1) alkyl groups having from 8 to 22 carbon atoms and (2) the group having the structure

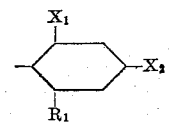

$X_1$ and $X_2$ each represents a member selected from the group consisting of H and $NO_2$, at least one of the substituents $X_1$ and $X_2$ representing $NO_2$; and $R_1$ represents an alkyl group having from 1 to 4 carbon atoms.

(References on following page)

References Cited

UNITED STATES PATENTS

| | | | |
|---|---|---|---|
| 2,689,858 | 7/1954 | Boyd | 260—429.5 X |
| 2,736,735 | 2/1956 | Michel | 260—429.3 |
| 2,864,679 | 12/1958 | Hamm et al. | 71—2.3 |
| 2,864,842 | 12/1958 | Walter | 260—429.3 |
| 2,868,633 | 1/1959 | Goodhue | 71—2.3 |
| 2,903,346 | 7/1959 | Coffield | 260—429.5 |

FOREIGN PATENTS 573,241    11/1945    Great Britain.

OTHER REFERENCES

Chemical Abstracts, vol. 49, page 8730d (1955).

Chemical Society Journal, pt. 4, 1958, pp. 4245, 4248 and 4249.

Prasad et al.: Jour. Indian Chem. Soc., vol. 35, No. 3 (1958), pp. 177–180.

TOBIAS E. LEVOW, *Primary Examiner.*

JAMES O. THOMAS, JR., *Examiner.*

A. J. ADAMCIK, H. M. S. SNEED, *Assistant Examiners.*